United States Patent Office 3,129,358
Patented Apr. 14, 1964

3,129,358
COLD LOAD PICK-UP APPARATUS FOR AN AUTOMATIC RECLOSER
Jack R. Harbaugh, Houston, Tex., and Robert J. Lawrence, Ellettsville, Ind., assignors to Westinghouse Electric Corporation, East Pittsburgh, Pa., a corporation of Pennsylvania
Filed Oct. 20, 1959, Ser. No. 847,595
8 Claims. (Cl. 317—22)

This invention relates generally to automatic reclosers and relates specifically to cold load pick-up apparatus therefor to facilitate pick-up of a cold load on a circuit after an outage.

In distribution circuits, an outage resulting from the loss of source voltage or the operation of a recloser to lock-out results in the loss of diversity in all the intermittent loads such as refrigerators, blowers and the like, being connected to the circuit awaiting reenergization. Such high currents are drawn on reenergization of the circuit that the regulation suffers, and in many instances the inrush current is greater than the recloser can handle thus causing it to open and operate to lock-out. Heretofore, separate automatic load pick-up switches having time delay means have been utilized to respond to outages of predetermined duration, or to a predetermined number of recloser interruption operations, short of lock-out, to sectionalize the circuit for a predetermined time to limit inrush currents and to permit gradual restoration of diversity.

It is an object of this invention to provide an automatic recloser with integral means enabling the recloser to pick-up a cold-load inrush current after restoration of the circuit following an outage.

More specifically, it is an object of this invention to provide an automatic recloser which automatically increases the minimum trip in the event of an outage to prepare the recloser for accommodating inrush currents upon restoration of the circuit.

It is another object of this invention to provide an automatic recloser with means for automatically adjusting the time-current trip characteristics after an outage to enable the recloser to pick-up cold load inrush currents upon restoration of the circuit, and at the same time provide short protection.

With the foregoing and other objects in view, our invention consists of the systems, combinations, structures, parts and methods of design and operation, hereinafter described and claimed and illustrated in the accompanying drawing, wherein:

Figure 1:
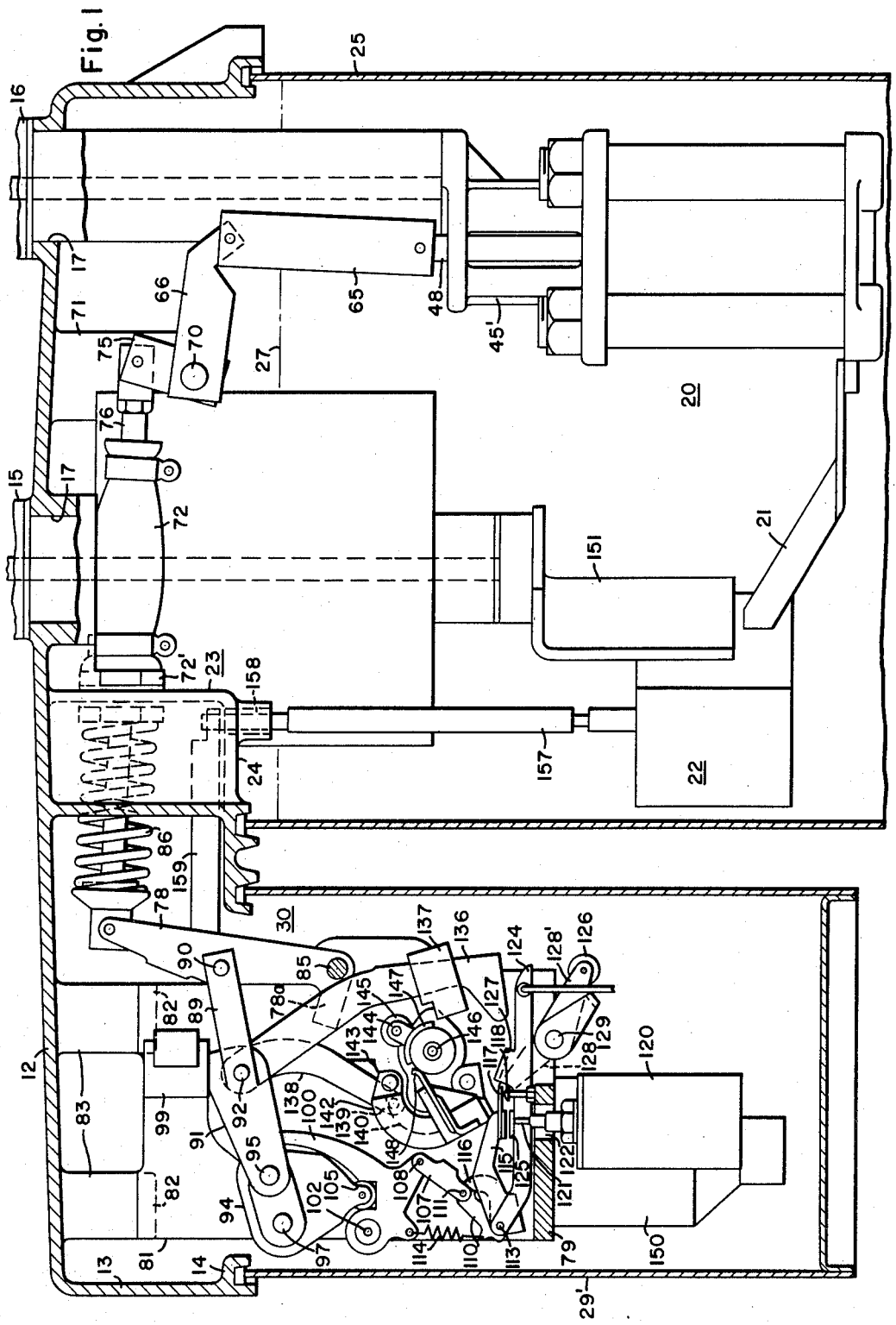
FIGURE 1 is a sectional view of a recloser showing one embodiment of the invention.
Figure 2:
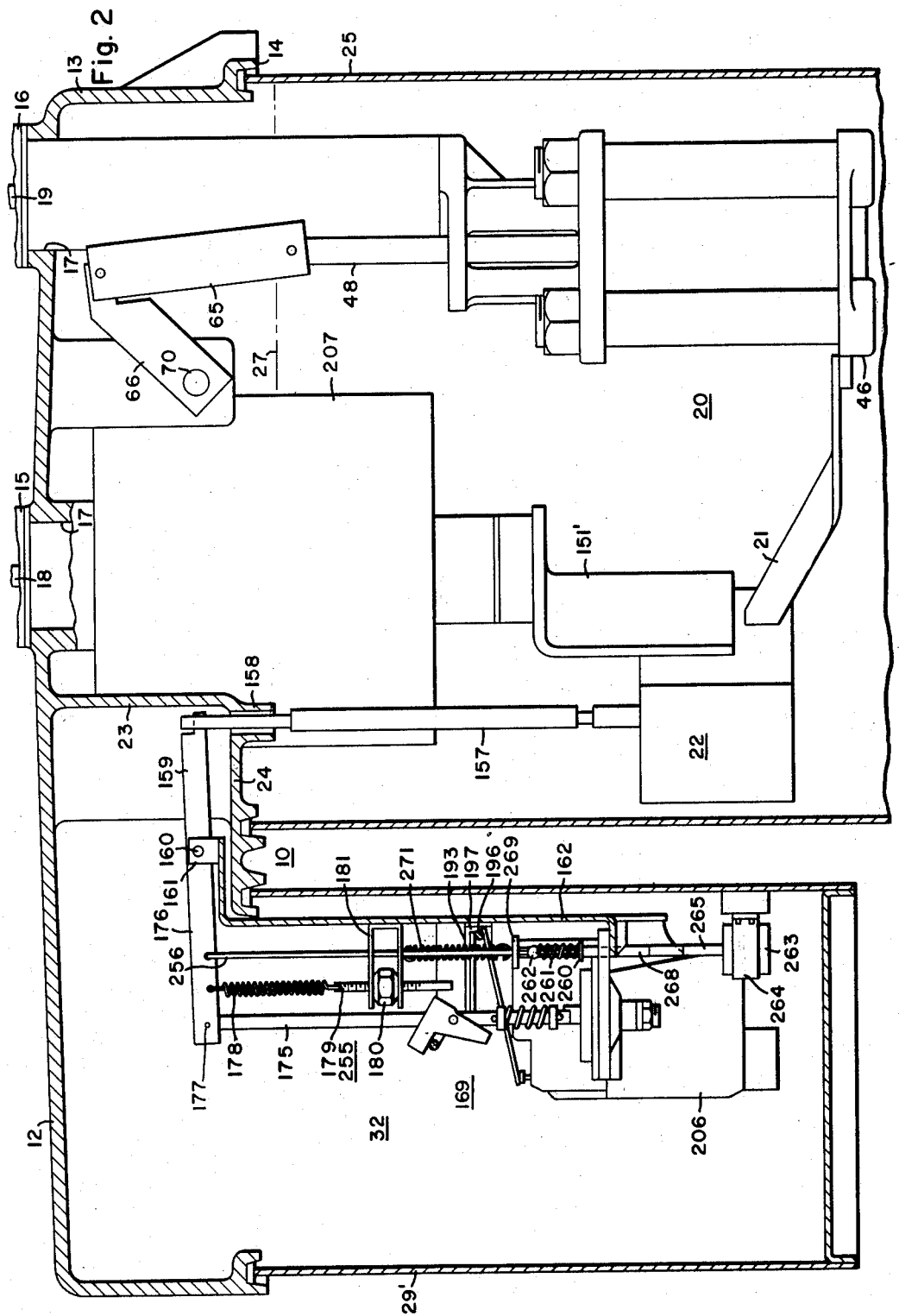
FIG. 2 is another sectional view of the recloser.
Figure 3:
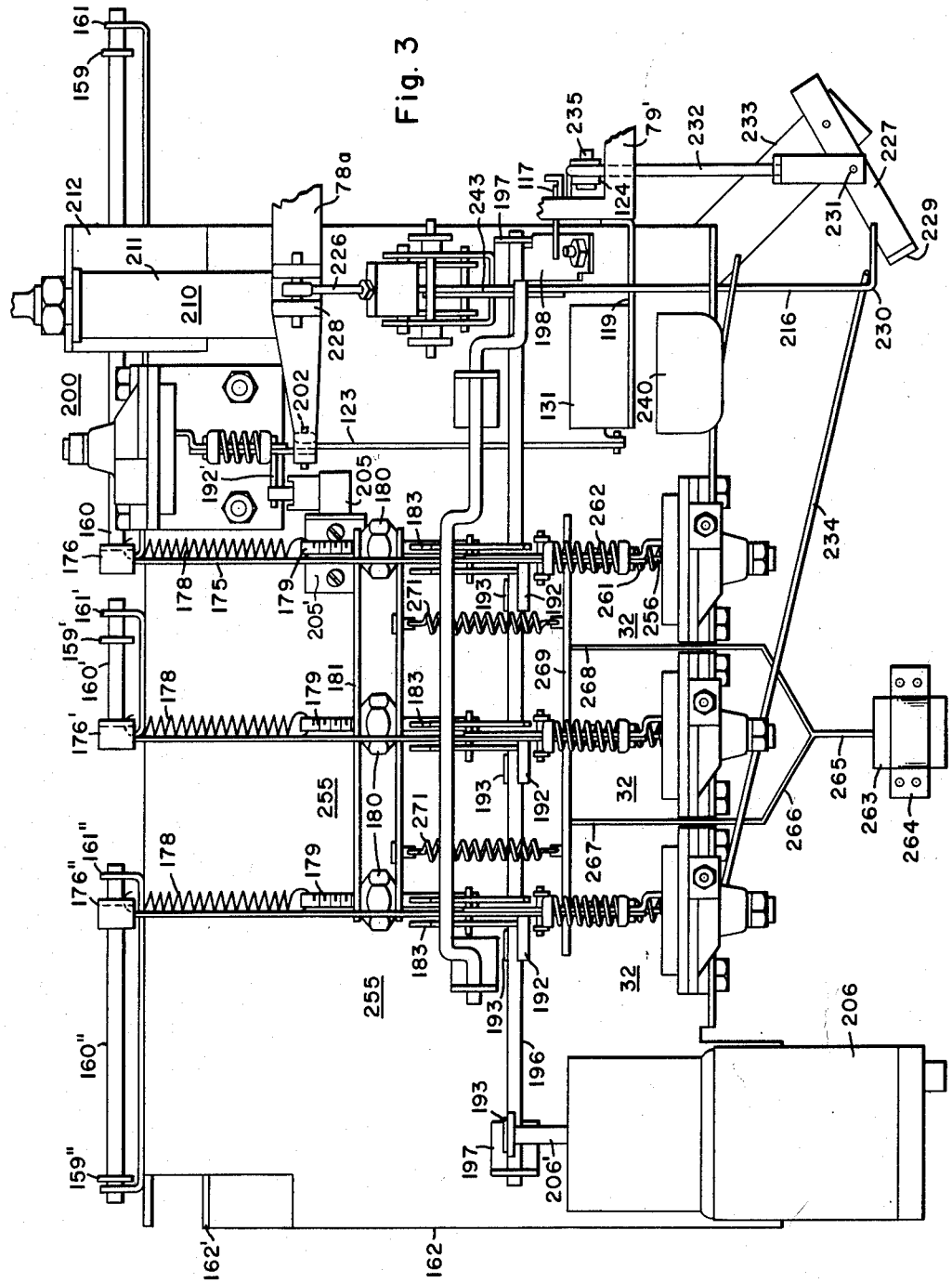
FIG. 3 is a front elevational view of the control panel shown in FIG. 2.

Referring to FIGS. 1, 2 and 3 it will be seen that this invention may be embodied in an automatic recloser generally of the type disclosed in Patent No. 2,858,395 issued October 28, 1958 to A. R. Harm et al. entitled "Automatic Recloser" and assigned to the assignee of the present invention, and wherein a polyphase recloser 10 comprises a substantially rectangular cover casting 12 having depending side portions 13 about the edge thereof with a flange 14 at the lower edge. Support brackets 11 are provided on the portions 13 at each end. The cover 12 is provided adjacent one edge with pairs of insulating bushings 15 and 16 for each of the three poles thereof. Only one pair of bushings 15 and 16 is shown, it being understood that additional poles and bushings are provided in the polyphase recloser as disclosed in the above-mentioned Harm et al. patent. Each pair of insulating bushings is arranged transversely of the longitudinal axis of the cover, the pairs being spaced from each other in the longitudinal direction to provide insulated entrances for conductors 18 and 19 of each phase through openings 17 in the casting. Each of the bushings, 16 supports at its lower end an interrupter 20 which is connected by means of a conductor 21 to a series type overcurrent trip element 22 supported at the lower end of the associated insulating bushing 15. The cover casting 12 is provided with a depending longitudinal intermediate wall or rib 23 having a flange 24 along its lower edge cooperative with the flange 14 so as to provide for securing an interrupter tank or casting 25 to the flanges 14 and 24 above the interrupters and overcurrent trip means, so that the interrupters and trip means may be positioned in insulating oil having a level designated by the dot-dash line 27. A separate tank 29' is secured to the casting 12 adjacent the tank 25 for enclosing an operating mechanism 30 shown in FIG. 1 and time delay means 32 shown in FIGS. 2 and 3.

In FIG. 1 there is shown an interrupter 20 including stationary contacts (not shown) and a contact rod 48 disengageably associated therewith. The contact rod 48 is connected by means of an insulating link 65 to a lever 66 secured to a shaft 70 rotatably mounted in suitable bearings positioned in boses 71 depending from the cover casting. The shaft 70 is provided with a lever 75 which is positioned opposite recess 31, and connected by means of a longitudinally movable link 76 to an operating lever 78 of the operating mechanism 30. A flexible sleeve 72 is secured at one end to link 76 and at the other end to a bushing 72' in the wall of recess 31 to provide a gas-tight seal. It is to be understood that each of the additional poles (not shown) has associated therewith an interrupter 20 and accompanying linkage connecting its contact rod 48 to the common shaft 70 so that all phaes may be interrupted simultaneously.

The operating mechanism 30 is mounted in a frame 79 which, as shown in FIG. 1, is substantially U-shaped, having a base 79' with upstanding sides 80 which are spaced apart and are secured by means of flanges 82 to bosses 83 depending from the cover casting 12. (Only one side 80, one flange 82 and one boss 83 are shown.) The operating lever 78 is pivotally mounted on a shaft 85 mounted in frame 79, and is biased in a counterclockwise direction by means of a spring 86 mounted on link 76 in connection with the wall of recess 31. The lever 78 is releasably held in the closed position shown, with the spring 86 compressed, by means of a toggle linkage comprising a link 89 connected to lever 78 by a pivot 90, a toggle link 91 pivotally connected to the link 89 by a common pivot 92, and a latch lever 94, which is connected to the toggle link 91 by a pivot 95 and is rotatably mounted on a shaft 97 supported in the frame 79.

The toggle linkage in the position shown has the toggle link 91 resting against a stop 99, with the pivots 92 and 95 in overcenter positions. The pivot 95 is maintained in this position by means of a latch 100 which is pivotally mounted in the frame 79 on a shaft 102, and has a recess 103 which receives a roller 105 on a lower portion of a latch lever 94. The latch 100 is maintained in the position shown, by a toggle linkage comprising a link 107 pivotally connected to the latch at 103, and a link 110 connected to link 107 by a pivot 111 and rotatably supported in the frame 79 on a fixed pivot 113. A spring 114 connects link 110 and latch 100. A trip lever 115 is rotatably mounted on the pivot 113 having a projection 116 for actuating the common pivot 111 overcenter and a laterally projecting pad 117 for operating the lever. An adjustable stop 118 normally engages pad 117 and holds the trip lever 115 in a position with the toggle levers 107 and 110 slightly overcenter.

When trip lever 115 is rotated counterclockwise, projection 116 breaks the toggle arrangement of links 107 and 110, permitting latch 100 to rotate clockwise and releases roller 105. Lever 94 rotates counterclockwise and pivot 95 moves farther overcenter, causing pivot 92 to drop undercenter and permit spring 86 to rotate operating lever 78 counterclockwise, moving link 76 to the left so as to rotate shaft 70 counterclockwise to lift contact rods 48, and causing links 107 and 110 to reset to the positions shown.

A shunt trip solenoid 120 is secured to the bottom of the mechanism frame 79, having an armature with a projection 121 which passes through an opening 122 in the bottom of the frame. An auxiliary trip lever 124 is pivotally mounted on the same pivot 133 as lever 115, and is provided with a laterally extending tab 125 disposed to be engaged by the projecting trip member 121 of the shunt trip solenoid, and also actuate the trip lever 115.

An auxiliary switch 131 (FIG. 3), is mounted on the frame 79 by means of a bracket 119 and operated from the lever extension 78a by means of a connecting link 123. Auxiliary switch 131 is open only when the interrupter contacts are closed.

The breaker may also be reclosed automatically by means of a closing link 138 also connected to the common pivot 92 and has a pin 139 at its lower end which is free to move in an arcuate slot 140 in a guide member 142. The closing link 138 is provided with a shoulder 143 disposed to be engaged by a roller 145 carried by a lever 144 on a shaft 146 rotatably mounted on the sidewall 81 of the mechanism frame. A drum switch comprising a contact segment 147 mounted on shaft 146, and a stationary contact member 148 is utilized as a limit switch in controlling the operation of a motor 150, which is mounted on the bottom of the mechanism frame and connected by means of a worm-gear drive (not shown) for rotating the shaft 146 to effect reclosing.

Figure 5:
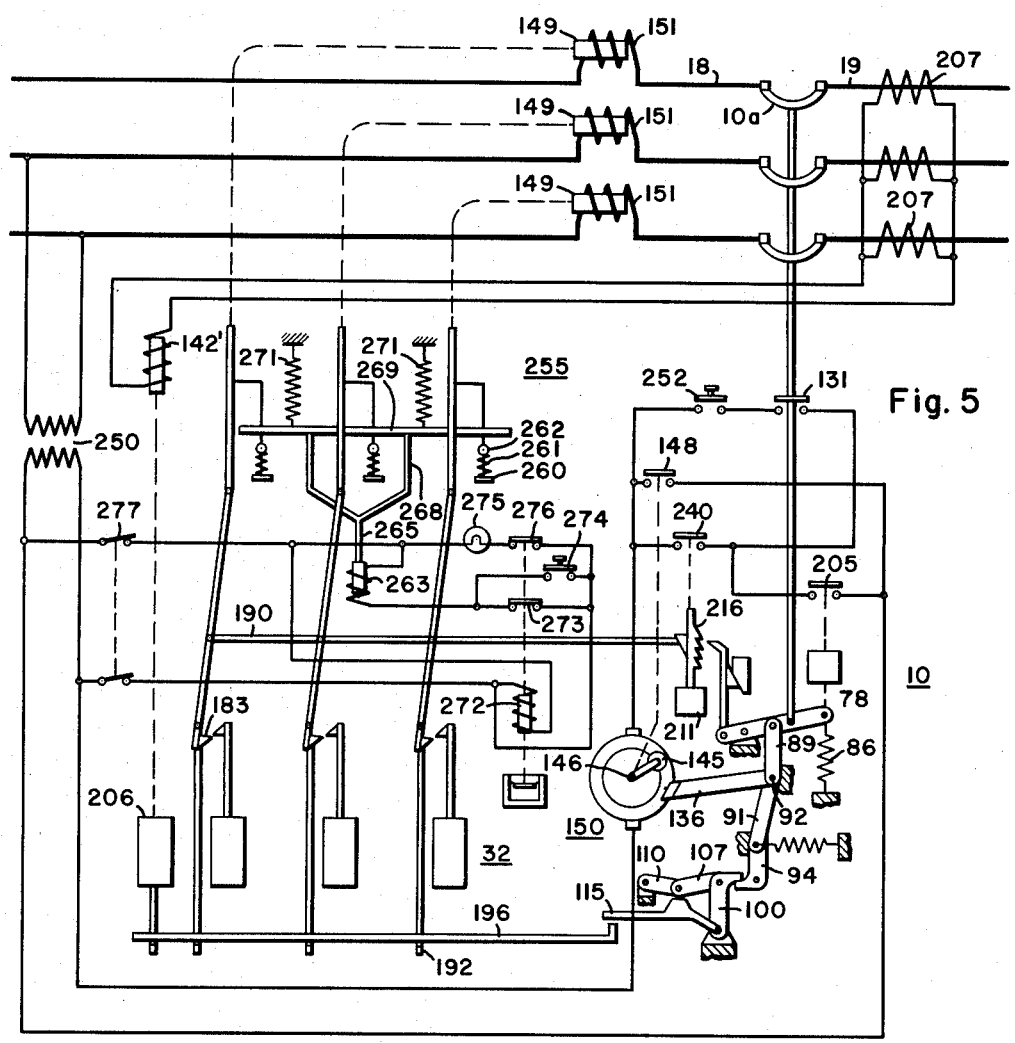
FIG. 5 is a diagrammatic view of the automatic recloser as shown in FIGS. 1, 2, 3, and 4 showing the circuit connections of the different elements.

In FIGS. 1 and 2, the overcurrent trip element 22, described in detail in the hereinbefore mentioned copending Harm et al. application, has an armature 149 and an operating coil 151 shown schematically in FIG. 5. The armature 149 is connected by means of an operating rod 157 which moves longitudinally in an opening 158 in flange 24 of the web 23, to arm 159, pivotally mounted as by means of a shaft 160 supported from the cover casting 12 by means of a bracket 161 on a panel 162 secured to the cover. The other pole units (not shown) are provided with similar overcurrent trip devices and shafts so that operation of their overcurrent relays are individual to the particular pole units.

The control panel 162 is mounted in the mechanism tank 29', being secured to the cover 12 by means such as brackets 162' to a portion of the central web 23. On this panel are mounted the plurality of time delay means 32 individual to each of the interrupters 20 for controlling the opening thereof. As shown in FIGS. 2 and 3, and as described in detail in the hereinbefore mentioned Harm et al. patent, each of the time delay means 32 may comprise a diaphragm type dashpot and a resilient lost motion connecting device 169 providing a resilient connection between the operating rod 175, which is connected to a crank lever 176 by a pivot 177, and a central boss of the diaphragm dashpot of the time delay means 32. This provides for resilient lost motion permitting immediate operation of the over-current trip relays 22 in the event of an excessive fault of, for example, about ten times normal current, thus modifying the normal inverse time-current characteristic thereof. Springs 178 are connected between a pin 179 adjustably mounted by means of a nut 180 and bracket 181 on panel 162 and tension lever 176' to adjust the current pick-up value of the delay means. A control valve (not shown) on the time delay means, provides for adjustably venting the air dashpot to vary the time delay action of the dashpot.

Operation of the several members 183 to connect delay means 32 to provide delayed tripping is provided by means of a common pivotal delay control member 190, which is pivotally mounted on the panel 160 as shown in FIGS. 2 and 3 and extends longitudinally thereof.

Tripping of the operating mechanism is effected by means of projecting arms 192 on the operating members 175 which engage levers 193 on a common trip bar or shaft 196 extending longitudinally of the panel. The trip bar 196 is pivotally mounted on the panel by means of brackets 197, and extends longitudinally, having a trip extension arm 198 adjacent the operating mechanism 30 which engages the pad 117 when raised, and actuates the trip lever 115 to open the contacts.

Also mounted on the panel 162 is an air dashpot time delay device 200 as shown in FIG. 3 of substantially the same type as the delay devices 32, the delay movement being provided for operation in the downward direction. This time delay device is operatively connected to an extension 78a of lever 78, a pin 202, to effect by means of projecting shoulders 192' delayed operation of a microswitch 205 which is mounted on panel 162 by a bracket 205' and used to set up a reclosing circuit for the closing motor 150.

A ground fault trip device 206 substantially similar to the overcurrent trip device described in detail in Patent No. 2,691,709 which issued on October 12, 1954 to H. J. Lingal et al., but responsive to a lower value of current is mounted on the panel 162 as shown in FIG. 3, having a solenoid actuated trip member 206' for also operating an extension 193 of the common trip bar 196 to effect separation of the contacts in response to a ground fault current. Bushing type current transformers 207 are mounted on the lower ends of the insulating bushings 15 in the interrupter tank 25 for supplying current to the ground fault trip device 206.

In order to provide for locking the recloser open after a predetermined number of closely consecutive openings, an integrator or counter 210 is provided. The integrator, described in detail in the aforementioned copending application, includes a substantially cylindrical body member 211 as shown in FIG. 3 having a bracket 212 by which it is secured to the panel 162. The cylindrical body member 211 is part of a time delay reset dashpot operable to reset the integrator downwardly if no subsequent interruption operation occurs. The counter member 216 is moved upwardly step-by-step in response to the downward movement of operating links 226 which are connected to arms 228 projecting laterally from the extension 78a of mechanism operating lever 78 as shown in FIG. 3.

At the lower end of counter member 216 is a lateral projection 230 which is disposed to be engaged by a projection 229 of a lever 227 pivotally connected at 231 to a link 232 connected to the shunt trip lever 124 by a pivot 235. The lever 227 is pivotally mounted on panel 162 by means of a bracket 233, as shown in FIG. 3. In the event that the trip lever 124 is moved in a counterclockwise direction by the shunt trip solenoid 120, the link 227 will be raised by the auxiliary trip lever 124 to advance the counter member 216 immediately to the lockout position. In this lockout position a microswitch or lockout switch 240, which is positioned to be engaged by the projection 230 after, for example, four closely successive opening operations of the recloser, or interrupts the operating circuit for the closing motor 150 to prevent reclosing, and thus locks the recloser open.

The counter member 216 has thereon an adjustably positioned cam member 243. The cam member 243 engages and positions a cam lever portion of the control member 190 which is pivotally mounted on the panel 162, which as shown in FIG. 3 actuates the time delay control members 183 to disconnect the delay devices 32 and render them normally ineffective on the first one or two opening operations.

Referring to FIG. 5, it will be seen that the recloser 10 is disposed to interrupt the circuit between conductors 18 and 19 of a three-phase circuit, the separable contacts being in this instance represented by the bridging type contact 10a in each instance. The trip relays 22 are shown with their trip coils 151 connected in circuit with the conductors 18 for operating armatures 149 which are operatively connected by means of dotted lines to actuate the common trip bar 196 through time delay devices 32, which have operating members 183 for disconnecting the delay means to obtain substantially instantaneous action, with the lever 190 for operating them actuated by cam 243 to the initial position as shown. Current transformers 207 are connected in parallel circuit relation to the trip coil 142' of the ground fault trip relay 206 for also operating the trip bar 196.

Operation of the trip bar 196 actuates trip lever 115, which breaks the toggle arrangement of levers 107 and 110 and disengages latch 100, to permit collapse of toggle levers 91 and 94 to the right, and hence permit toggle link pivot 92 to pass undercenter and provide for pivotal movement of operating lever 78 by its opening spring 86, which is compressed in the closed condition of the recloser. Operation of lever 78 actuates pawl 225 to advance the counter member 216 each time the breaker opens. A predetermined time after the breaker opens, a circuit is provided for the closing motor 150 through the lockout switch 240, which is normally closed, the time delayed reclosing switch 205, which is operated by the mechanism lever 78, and limit switch 148, which is actuated by motor 150.

Energization of the closing motor 150 from a source such as a control transformer 250 effects rotation of shaft 146 and causes roller 145 to engage closing link 136 and return the common pivot 92 of toggle links 89 and 91 to the overcenter position shown, thus causing rotation of the closing lever 78 in a direction to close the contacts. Shortly after the operating mechanism begins to move, the reset switch 205 opens and drum limit switch 148 closes to maintain the energizing circuit until the recloser is reclosed. After a predetermined number of such operations, the counter member 216 operates the lockout switch 240 to interrupt the energizing circuit for the motor 150 and thus provide for locking the counter in the open position. Reclosing may then be effected by means of a control switch 252 which parallels and bypasses the lockout switch 240. Since the pawl 225 holds the counter member 216 advanced, when the recloser is locked open, only a single operation is initially required to again lock the recloser open when it is reclosed following lockout.

Figure 4:
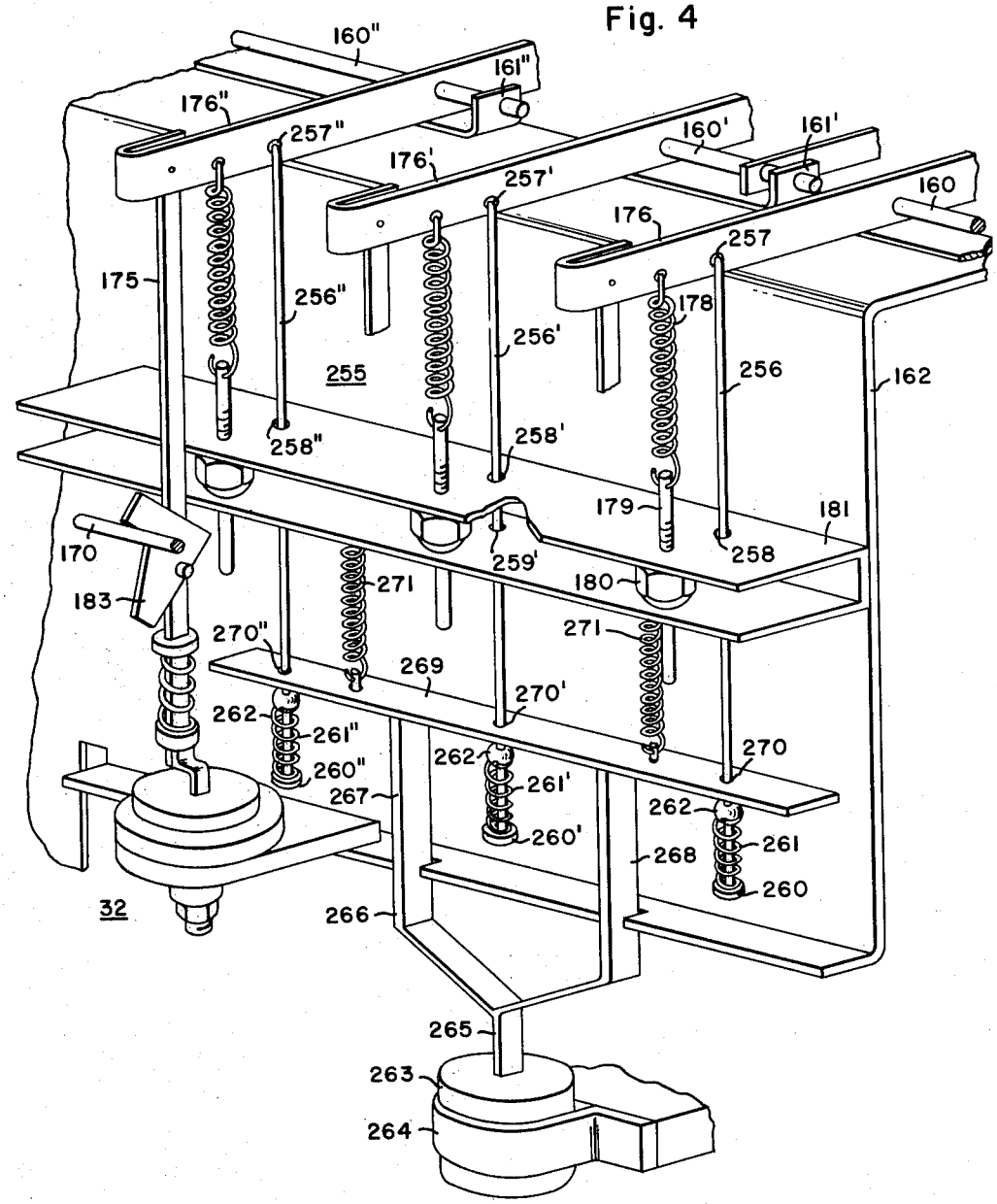
FIG. 4 is an enlarged perspective view, taken partly in section, of the cold load pick-up apparatus of FIGS. 2 and 3.

In accordance with the present invention, an automatic recloser such as hereinbefore described is provided with an integral cold load pick-up apparatus attachment 255 comprising electro-mechanical apparatus for varying the tension on the tension levers 176, 176' and 176" to thus adjust the current pick-up value of the recloser. Referring particularly to FIG. 4, it will be seen that each previously described tension bar 176 is provided with a tension applicator 256 such as a stiff wire, having one end hooked through an aperture 257 in the corresponding tension rod 176, and depending through aligned apertures 258 and 259 in the support bracket 181. The apertures 257 are each spaced from the corresponding pivot shaft 160 to provide a counterclockwise force moment about shaft 160 when a downwardly directed force is applied to the applicator 256. At the same time the aperture 257 is positioned adjacent tension adjusting spring 178 on the same side as the pivots 160 so that a downwardly directed force or tension applied to applicator 256 will additively combine with the tension on springs 178 to thus provide additional opposition to the clockwise movement of tension levers 176 about shaft 160, and in this manner increase the minimum trip current required to operate the recloser. A stop 260 is attached to the lower end of each applicator 256 and may be adapted for vertical adjustment along the axis of the applicator by means of threads or the like. A coil spring 261 is sleeved on each applicator 256 and has a lower end abutting the stop 260 and an upper end supporting a spring guide 262 comprised of a sphere of plastic or the like, and slidably sleeved on the applicator 256. It will be seen that forced movement of the spheres a predetermined distance from the floating rest position, as shown in FIG. 4, in a downward direction along the axis of the applicator wire 256 to partially compress the spring 261 between the sphere 262 and the stop 260, will apply a downwardly directed force on applicator wire 256 to provide a counterclockwise biasing tension on tension lever 176 to increase the minimum trip by a predetermined amount. At the same time the spring structure provides short circuit protection since the tension lever 176 may override the biasing force of the spring. The means for moving the spheres downwardly along the axes of the wires 256 is comprised of a solenoid coil 263 fixedly attached to the inside wall of the tank 29' by any suitable means such as a bracket 264, and having a normally extending armature 265, as shown in FIG. 4. A U-shaped bracket 266 having legs 267 and 268 is rigidly attached to the upper end of armature 265 and serves as a support for a cross bar or shoulder 269 rigidly fixed across the legs 267 and 268 and extending perpendicularly to the longitudinal axis of the applicator wires 256. The cross bar or shoulder 269 includes apertures 270 vertically aligned with the apertures 257 on the tension levers 176, and apertures 258 and 259 in the support bracket 181, each aperture 270 being large enough to accommodate one of the depending applicator wires 256 but being smaller than the spheres 262. When the solenoid 263 is energized, the armature 265 will be pulled downwardly into the solenoid coil 263, thus carrying the bracket 266 and cross bar 269 downwardly to engage the upper portions of all the spheres 262 simultaneously, and force the spheres downwardly along the longitudinal axis of the wires 257 a predetermined distance to partially compress the springs 261 and thus increase the counterclockwise tension on the tension arms 176, as previously described.

Figure 6:
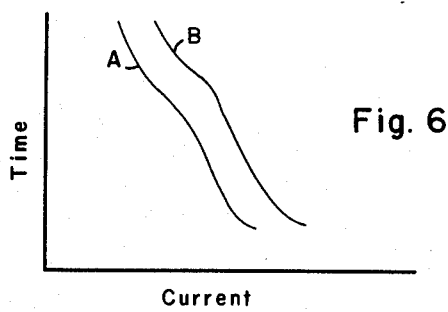
FIG. 6 is a plot of the inverse time-current characteristics of the recloser when operating normally and when operating to pick-up cold loads.

When the solenoid coil 263 is in the normal deenergized condition as shown in FIG. 4, the armature 265 is fully extended so that the cross bar 269 is positioned out of engagement with the spheres 262 to permit unitary uninhibited or floating vertical movement of the wires 256 and corresponding spheres 262, springs 261 and stops 260 when the recloser is operating in the normal manner as previously described. A pair of cross bar return springs 271 are connected in any suitable manner between the support bracket 181 and the cross bar 269 to normally bias the armature 265 and cross bar 269 in the upper position as shown in FIG. 4. When the solenoid coil 263 is energized after an extended outage, in a manner to be presently described, so as to bias the tension levers 176 in a counterclockwise direction as hereinbefore described, the normal time-current curve A as shown in FIG. 6 is moved to the right a predetermined amount to increase the minimum trip and to otherwise establish a new time-current curve B for the duration of the inrush current.

A loss of voltage sensing means is provided to preset the actuator coil 263 for energization when the source voltage is restored, and comprises a time delay pick-up relay 272, as shown diagrammatically in FIG. 5, connected across the secondary of the voltage transformer 250 so as to be normally energized when source voltage is present in conductors 18. The actuator coil 263 is also connected in parallel with the time delay relay 272 with respect to the secondary of the transformer 250, and is series connected with contacts 273 of time delay relay 272. The contacts 273 are open only when the time delay relay 272 is energized; therefore, so long as source voltage is present in conductors 18, the time delay relay 272 is energized to hold open contacts 273 to thus maintain the actuator coil 263 in a deenergized condition and thus disengage the spring biasing means. Upon the loss of source voltage, the time delay relay 272 is immediately deenergized whereupon contacts 273 close to connect the actuator coil 263 across the secondary of the voltage transformer 250. When power is restored, the transformer 250 is energized and the actuator coil 263 picks-up to energize the cold load pick-up apparatus. At the same time, the time delay relay 272 is energized, but because of its time delay action will not open contacts 273 to deenergize the actuator coil 263 until an adjustable predetermined time has elapsed after restoration of power, which time delay is selected to open contacts 273 only after a sufficient time has elapsed to permit the current to return to normal. Upon deenergization of the actuator coil 263, the cross bar return springs 271 raise the cross bar to disengage the spring biasing means, thus returning the recloser to normal operation on the time-current characteristic curve A.

In the event that outage is caused by operation of the recloser to lock-out, in the manner previously described, rather than through loss of source voltage, a pushbutton circuit is provided so that operating personnel may manually operate the cold load apparatus to pick-up inrush current when the recloser is reclosed. This circuit comprises a pushbutton 274 connected in parallel with contacts 273 of time delay relay 272, and connected in series circuit relationship with the actuator coil 263 and the secondary of the voltage transformer 250. Operation of pushbutton 274 by-passes time delay relay 272 to immediately energize actuator coil 263. It is to be noted that either contacts 273 or pushbutton 274 may operate the actuator solenoid 263 depending upon the conditions initiating the outage. In practice, the operator closes the pushbutton 274, then operates the control button 252 to reclose the automatic recloser.

An indicator 275, such as a lamp, may be connected in parallel with the actuator coil 263 so as to indicate operation of the cold load pick-up apparatus, and may be series connected with contacts 276 of time delay relay 272. It is seen that energization of the time delay relay prevents energization of the indicator 276.

In operation, the time delay relay 272 is normally energized by the presence of source voltage in conductors 18 and transformer 250 so that contacts 273 are held open to prevent energization of actuator solenoid 263, while contacts 276 are also held open to prevent energization of the indicator 275. In the cold load pick-up apparatus the cross bar return springs 271 hold the cross bar 269 and armature 265 in disengagement with the spheres 262. Under these conditions the normal operation of the recloser is unaffected by the cold load pick-up apparatus. Upon the loss of source voltage in conductors 18, the time delay relay 272 is deenergized whereupon contacts 273 close to set up the energizing circuit for actuator coil 263 while contacts 276 close to set up the energizing circuit for the indicator 275. When source voltage is restored, actuator coil 263 is energized to engage the cross bar 269 with the spheres 262 to compress the springs 261, thus adding the predetermined biasing tension of the springs 261 to the wires 256 and tension levers 176 to increase minimum pick-up current and otherwise move the time current curve to the right to provide additional time delay for accommodating inrush currents. In the event a short circuit occurs, the trip bar 196 of the recloser may be operated in the usual manner by the further compression of springs 261 as the overcurrent detecting means 22 operates to rotate tension levers 176 clockwise about pivot pins 160 to thus override the added bias. If the normal inrush current is not exceeded, the time delay relay opens the contacts 273 and 276, after a predetermined time lapse, to deenergize the actuator solenoid 263 and the indicator 275, respectively. The cross bar return springs withdraw the armature 265 from the actuator coil 263 and disengage cross bar 269 from the spheres 262 to thus return the recloser to normal operating conditions. In the event the recloser automatically trips to lock-out, the operator first operates push-button 274 to energize the actuator coil 263, then operates the control switch 252 to reclose the recloser.

The distance that the cold load time current characteristic curve B is moved to the right of normal curve A is adjustable as governed by the vertical position of the stop 260 on the wire 256 which adjusts the amount of compression applied to spring 261 when the cross bar is moved downwardly against spheres 262.

Inasmuch as certain changes may be made in the above described construction, and different embodiments of the invention may be made without departing from the spirit and scope thereof, it is intended that all the above descriptive matter, including the drawings, shall be considered as illustrative and not in a limiting sense.

We claim as our invention:

1. In a circuit interrupter: separable contacts in the circuit; means including trip means operable to separate the contacts; overcurrent responsive means in the circuit; means movable in a first direction to operate the trip means in response to operation of the overcurrent responsive means; normally relaxed spring means carried by the movable means and normally having no effect upon the circuit interruption operations; means operable after an outage to store energy in the spring means to oppose movement of the movable means in the said first direction after the outage is eliminated.

2. In a circuit interrupter: separable contacts in the circuit; means including trip means operable to separate the contacts; overcurrent responsive means in the circuit; means movable in a first direction to operate the trip means in response to operation of the overcurrent responsive means; spring means having one end carried by the movable means and having the other end normally free; means operable after an outage to engage the free end to store energy in the spring means to oppose movement of the movable means in the said first direction after the outage is eliminated.

3. In a circuit interrupter: separable contacts in the circuit; means including trip means operable to separate the contacts; overcurrent responsive means in the circuit; means movable in a first direction to operate the trip means in response to operation of the overcurrent responsive means; normally relaxed spring means carried by the movable means and normally having no effect upon the circuit interruption operations; means including a solenoid operable after an outage to store energy in the spring means to oppose movement of the movable means in the said direction for a predetermined time after the outage is eliminated.

4. In a circuit interrupter: separable contacts in the circuit; means including trip means operable to separate the contacts; overcurrent responsive means in the circuit; means movable in a first direction to operate the trip means in response to operation of the overcurrent responsive means; spring means having one end carried by the movable means and having the other end normally free; means operable after an outage to move the free end relative to the other end to store energy in the spring means in opposition to movement of the movable means in the said first direction after the outage is eliminated.

5. In a circuit interrupter: separable contacts in the circuit; means including trip means operable to separate the contacts; overcurrent responsive means in the circuit; means movable in a first direction to operate the trip means in response to operation of the overcurrent responsive means; spring means having one end carried by the movable means and having the other end normally free; a solenoid having an armature positioned adjacent the free end of the spring means and disengaging said free end when the solenoid is in a first condition of energization and operable to engage the free end when the solenoid is in a second condition of energization to store energy in the spring means in opposition to movement of the movable means in said first direction; and means operable to place the solenoid in said second condition of energization after an outage.

6. In a circuit interrupter: separable contacts in the circuit; means including trip means operable to separate the contacts; overcurrent responsive means in the circuit; means movable in a first direction to operate the trip means in response to operation of the overcurrent responsive means; spring means having one end carried by the movable means and having the other end normally free; a solenoid having an armature positioned adjacent the free end of the spring means and disengaging said free end when the solenoid is in a first condition of energization and operable to engage the free end when the solenoid is in a second condition of energization to store energy in the spring means in opposition to movement of the movable means in said first direction and means operable to place the solenoid in said second condition of energization after an outage for a predetermined time after elimination of the outage.

7. In an automatic recloser: separable contacts in the circuit; means operable to separate and reclose the contacts in response to current in the circuit in excess of a predetermined minimum value; means operable to lock open the contacts after a predetermined number of contact separation operations occurring within a predetermined time; manually operative means to reclose the recloser after lock-out; means operable to bias against the operation of the contact separation means; means operable in response to loss of source voltage in the circuit to set the biasing means for operation when the source voltage is restored; and manually operable switch means for operating the biasing means after a lock-out separation operation and before operation of the manually operative reclosing means.

8. In a polyphase circuit interrupter: separable contacts in each phase; means including trip means operable to separate the contacts; overcurrent responsive means in each phase; means corresponding to each overcurrent responsive means and movable in a first direction to operate the trip means in response to operation of the corresponding overcurrent responsive means; normally relaxed spring means carried by each movable means and normally having no effect upon the circuit interruption operations; means operable after an outage to store energy in all the spring means to oppose movement of the movable means after the outage is eliminated.

References Cited in the file of this patent

UNITED STATES PATENTS

| | | |
|---|---|---|
| 1,124,599 | Fessenden | Jan. 12, 1915 |
| 1,294,213 | Whittingham | Feb. 11, 1919 |
| 2,519,291 | Sandin et al. | Aug. 15, 1950 |
| 2,632,823 | Oppel | Mar. 24, 1953 |
| 2,795,671 | Edwards | June 11, 1957 |
| 2,892,057 | MacNeill | June 23, 1959 |
| 2,905,786 | Scott | Sept. 22, 1959 |